United States Patent
Sohn et al.

(10) Patent No.: US 7,438,063 B1
(45) Date of Patent: Oct. 21, 2008

(54) EXHAUST GAS RECIRCULATION SYSTEM OF VEHICLE

(75) Inventors: Youngmin Sohn, Hwaseong (KR); Wootae Kim, Suwon (KR); Chun Woo Lee, Hwaseong (KR); Myong Ho Kim, Suwon (KR); Ingee Suh, Yongin (KR); Seung Woo Lee, Seoul (KR); Sung Wook Lee, Seoul (KR); Jin Hong Kim, Yongin (KR); Yong Yun Hwang, Anyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/861,441

(22) Filed: Sep. 26, 2007

(30) Foreign Application Priority Data

May 7, 2007 (KR) .................. 10-2007-0044198

(51) Int. Cl.
*F02B 47/08* (2006.01)
*F02B 47/10* (2006.01)
(52) U.S. Cl. ............................ 123/568.12; 123/568.13
(58) Field of Classification Search ............ 123/568.12, 123/568.13, 568.11, 540
See application file for complete search history.

(56) References Cited

U.S. PATENT DOCUMENTS

| | | | | |
|---|---|---|---|---|
| 5,425,346 A | * | 6/1995 | Mavinahally | 123/568.13 |
| 6,470,865 B2 | * | 10/2002 | Iizuka et al. | 123/568.13 |
| 7,069,918 B2 | * | 7/2006 | Mackey et al. | 123/568.12 |
| 7,089,890 B2 | * | 8/2006 | Obidi | 123/41.31 |
| 2002/0005190 A1 | * | 1/2002 | Bianchi | 123/568.12 |
| 2004/0000297 A1 | * | 1/2004 | Strawbridge | 123/568.13 |
| 2004/0255918 A1 | * | 12/2004 | Mackey et al. | 123/568.12 |

FOREIGN PATENT DOCUMENTS

JP 07042628 A * 2/1995

* cited by examiner

*Primary Examiner*—Mahmoud Gimie
(74) *Attorney, Agent, or Firm*—Morgan Lewis & Bockius LLP

(57) ABSTRACT

An exhaust gas recirculation system. A water jacket in a cylinder block is configured for coolant to flow therein. A cylinder head is attached to the cylinder block. A cylinder is disposed in the cylinder block and the cylinder head. An intake manifold runner is connected to an intake hole of the cylinder. An exhaust manifold runner is connected to an exhaust hole of the cylinder. A first recirculation gas pathway is disposed in the cylinder block, and receives recirculated exhaust gas from the exhaust manifold runner. A second recirculation gas pathway is disposed in the cylinder head, and has a first end connected to the first recirculation gas pathway and a second end connected to the intake manifold runner. A recirculation valve, mounted at the second recirculation gas pathway, controls supply of the recirculated exhaust gas to the intake manifold runner. An engine control unit controls the recirculation valve.

9 Claims, 3 Drawing Sheets a) EGR valve is closed b) Vehicle moves under a high load condition c) Vehicle moves under a low load condition

EXHAUST GAS RECIRCULATION SYSTEM OF VEHICLE

CROSS-REFERENCE TO RELATED APPLICATION

This application claims priority to, and the benefit of, Korean Patent Application No. 10-2007-0044198, filed in the Korean Intellectual Property Office on May 7, 2007, the entire contents of which are incorporated herein by reference.

BACKGROUND OF THE INVENTION (a) Field of the Invention

The present invention relates to an exhaust gas recirculation system of a vehicle. More particularly, the present invention relates to an exhaust gas recirculation system of a vehicle with a recirculation gas pathway in a cylinder block, configured such that coolant in the water jacket cools the recirculated exhaust gas, and supply of the recirculated exhaust gas is controlled based on driving conditions by a recirculation valve.

(b) Description of the Related Art

Generally, the amount of NOx in exhaust gas is high in an oxygen rich air mixture. A typical the exhaust gas recirculation system reduces the amount of NOx in the exhaust gas by recirculating a portion of the exhaust gas to the air mixture, thus reducing the oxygen ratio in the air mixture.

A hot EGR system retards ignition and reduces the air/fuel ratio, and a cooled EGR system lowers the temperatures of the combustion chamber and hinders combustion by cooling the recirculated exhaust gas. The hot and cold exhaust gas recirculation systems can be used together, such as by using the hot exhaust gas recirculation system under low load and the cold exhaust gas recirculation system under medium and high loads.

The cold exhaust gas recirculation system includes a cooler that cools the recirculated exhaust gas. However, the cooler is large and heavy. In addition, an exhaust gas recirculation valve may not control the amount of recirculated exhaust gas in accordance with driving conditions.

The above information disclosed in this Background section is only for enhancement of understanding of the background of the invention and therefore it may contain information that does not form the prior art that is already known in this country to a person of ordinary skill in the art.

SUMMARY OF THE INVENTION

An exhaust gas recirculation system of a vehicle. A water jacket is disposed in a cylinder block and configured for coolant to flow therein. A cylinder head is attached to the cylinder block. A cylinder, with an intake hole and an exhaust hole, is disposed in the cylinder block and the cylinder head. An intake manifold runner is connected to the intake hole. An exhaust manifold runner is connected to the exhaust hole. A first recirculation gas pathway is disposed in the cylinder block, and connected the exhaust manifold runner such that it receives recirculated exhaust gas from the exhaust manifold runner. A second recirculation gas pathway is disposed in the cylinder head. A first end of the second recirculation gas pathway is in fluid communication with the first recirculation gas pathway and a second end is in fluid communication with the intake manifold runner. A recirculation valve is mounted at the second recirculation gas pathway, for controlling supply of the recirculated exhaust gas to the intake manifold runner. An engine control unit controls the recirculation valve.

The first recirculation gas pathway may be in thermal communication with the water jacket. A catalytic converter may be provided between the exhaust manifold runner and the first recirculation gas pathway. A temperature sensor may be mounted on the second recirculation gas pathway for measuring a temperature of the recirculated exhaust gas.

The second recirculation gas pathway may include first and second pathway portions, fluidly isolated from one another by a partition running along a longitudinal direction of the second recirculation gas pathway. The recirculation valve may opens the first and/or second pathway portions depending on driving conditions, such as by opening both portions under high load conditions, and only the second portion under low load conditions.

The recirculation valve may be a solenoid valve.

DETAILED DESCRIPTION OF PREFERRED EMBODIMENTS

Hereinafter, an exemplary embodiment of the present invention will be described in detail with reference to the accompanying drawings.

Figure 1:
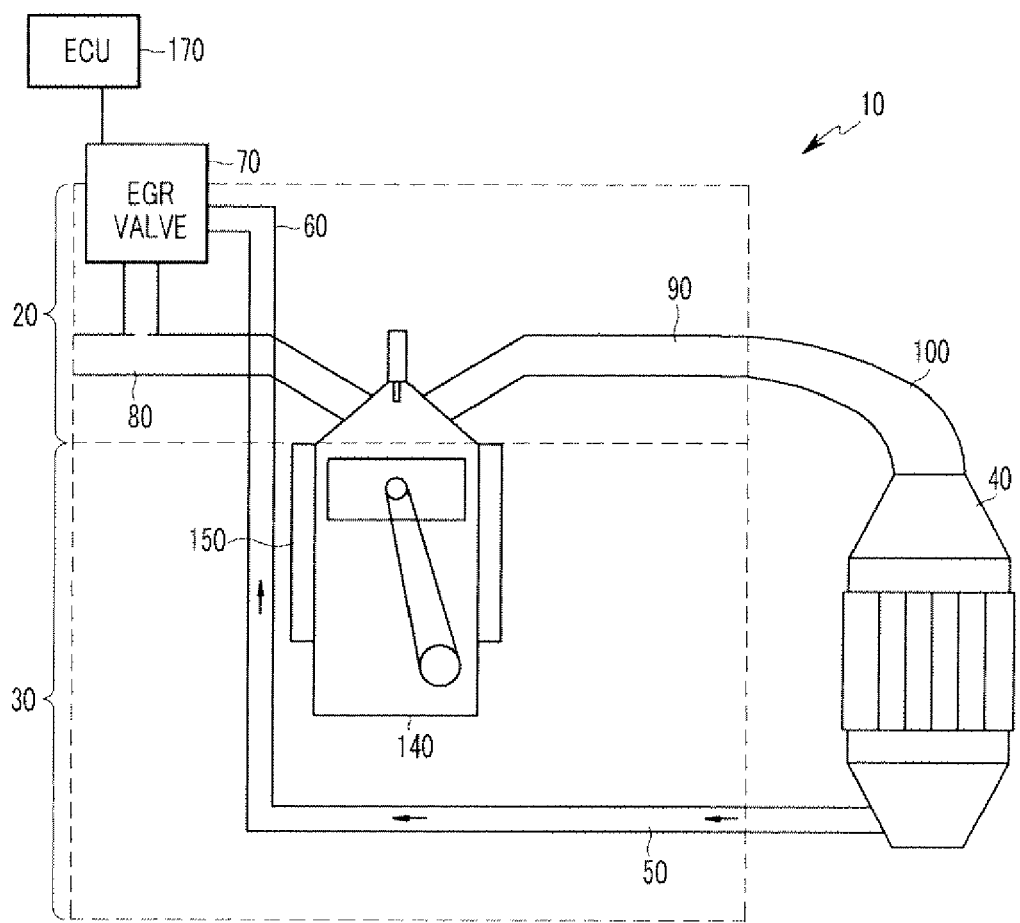
FIG. 1 is a schematic diagram of an exhaust gas recirculation system of a vehicle according to an exemplary embodiment of the present invention.
Figure 2:
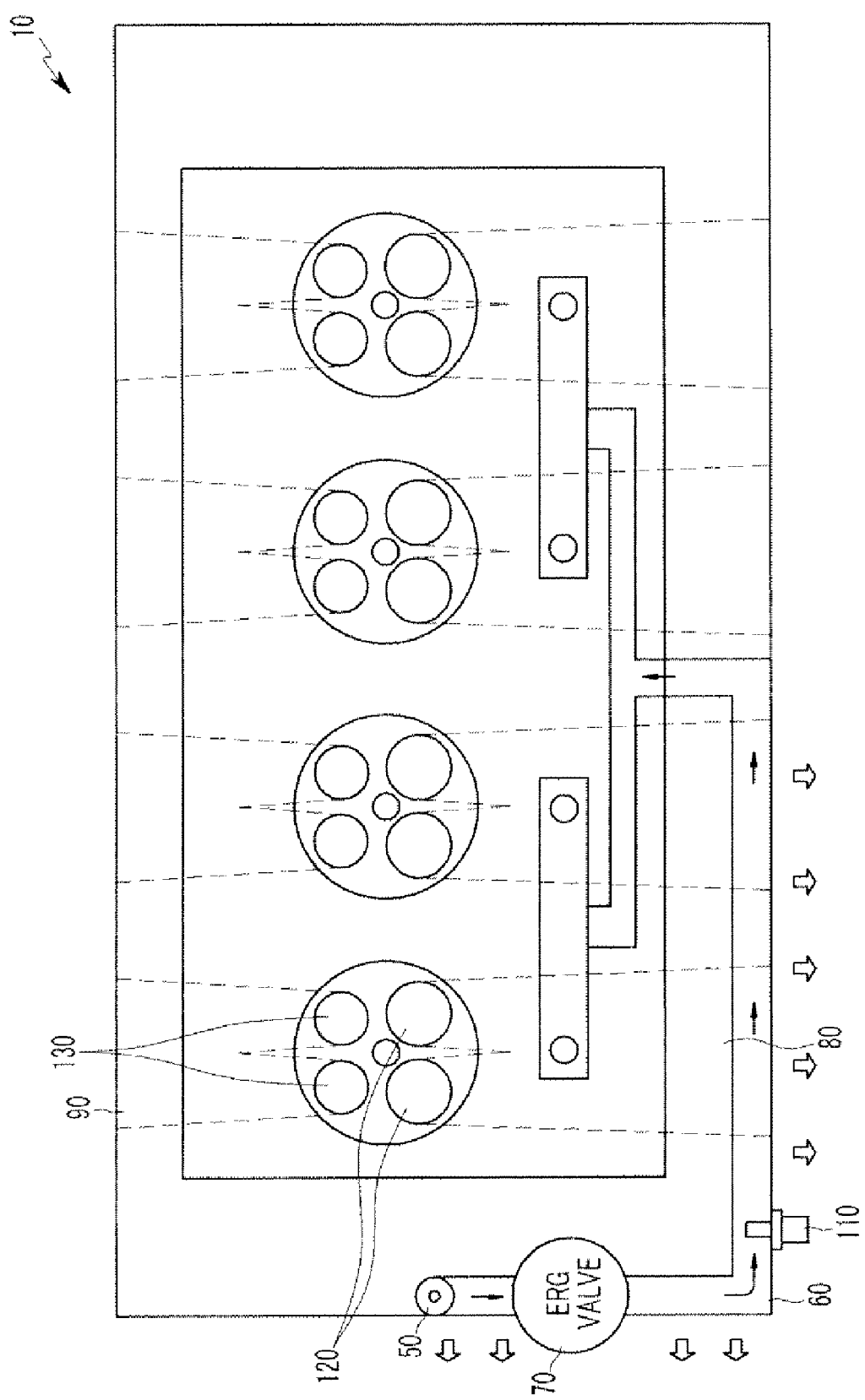
FIG. 2 is a schematic view of the interior of an engine according to an exemplary embodiment of the present invention.

As shown in FIG. 1 and FIG. 2, an exhaust gas recirculation system of a vehicle according to an exemplary embodiment of the present invention includes an engine 10, a catalytic converter 40, and an engine control unit (ECU) 170.

The engine 10 includes a cylinder head 20 and a cylinder block 30, and at least one cylinder 140 is installed in the cylinder head 20 and the cylinder block 30.

A water jacket 150 is provided around the cylinder 140 in the cylinder block 30 such that coolant flowering in the water jacket 150 cools the cylinder 140.

An intake manifold and an exhaust manifold are mounted at the cylinder head 20, which is located at an upper part of the cylinder 140. At least one intake manifold runner 80 and at least one intake hole 120 are provided in the intake manifold, and at least one exhaust manifold runner 90 and at least one exhaust hole 130 are provided in the exhaust manifold. An air mixture provided to the cylinder 140 via the intake manifold runner 80 and the intake hole 120 is combusted, creating engine torque. Exhaust gas generated in the combustion process flowers to an exhaust pipe 100 via the exhaust hole 130 and the exhaust manifold runner 90.

The catalytic converter 40 is connected to the exhaust pipe 100 and receives the exhaust gas. The catalytic converter 40 filters the exhaust gas and exhausts the filtered exhaust gas to the exterior of the vehicle. Some of the filtered exhaust gas is mixed in to the air mixture and supplied to the cylinder 140.

The engine control unit 170 controls fuel injection timing, ignition timing, air/fuel ratio, and opening of a recirculation valve. The engine control unit 170 may include a processor, memory, and associated hardware, software, and/or firmware as may be selected and programmed by a person ordinary skill in the art based on the teachings herein.

The catalytic converter 40 is connected to the intake manifold runner 80 iva first and second recirculation gas pathways 50 and 60. The first recirculation gas pathway 50 is disposed around the water jacket 150. Therefore, the recirculated exhaust gas is cooled by the coolant in the water jacket 150. The first recirculation gas pathway 50 may be designed to have an appropriate shape by a person of ordinary skill in the art, based on the teachings herein.

Figure 3:
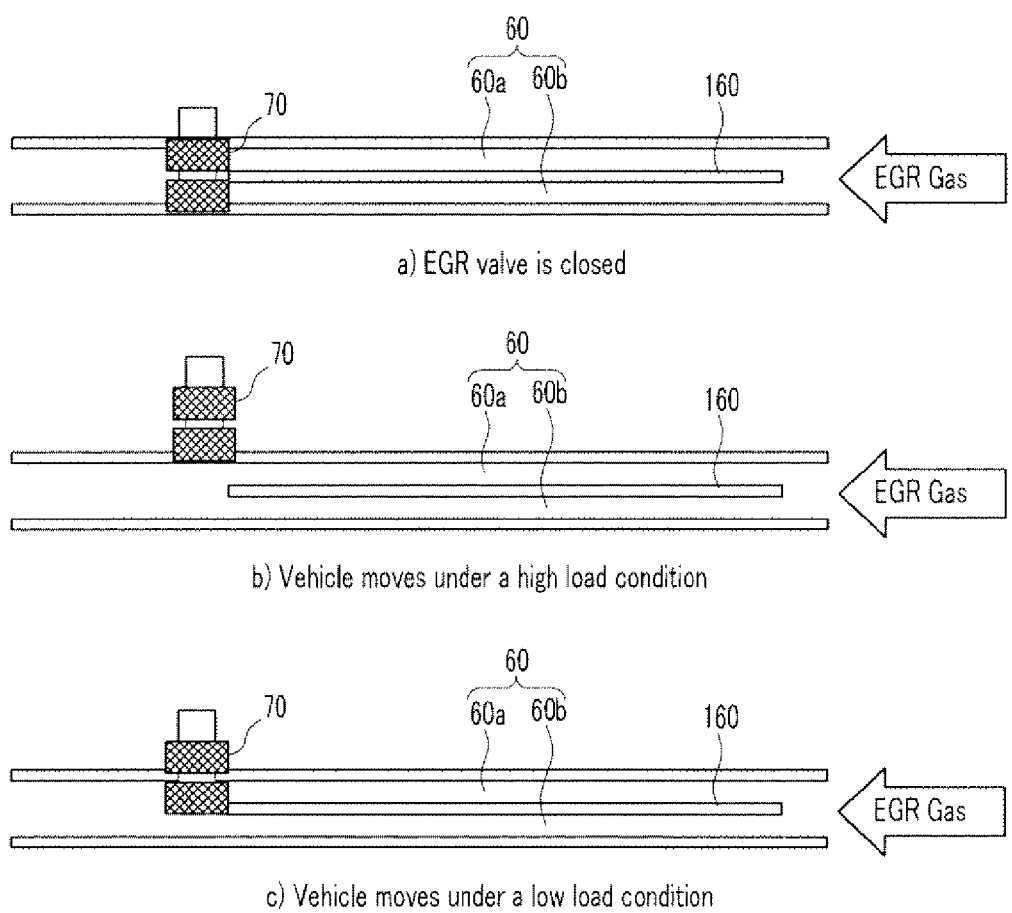
FIG. 3 is a schematic diagram showing operation of a recirculation valve according to an exemplary embodiment of the present invention.

The second recirculation gas pathway 60 is disposed in the cylinder head 20. One end of the second recirculation gas pathway 60 is connected to the first recirculation gas pathway 50, and the other end thereof is connected to the intake manifold runner 80. In addition, as shown in FIG. 3, the second recirculation gas pathway 60 is divided into first and second pathways 60a and 60b by a partition 160 along the longitudinal direction. A recirculation valve 70 and a temperature detector 110 are mounted in or on the second recirculation gas pathway 60.

The recirculation valve 70 controls supply of the recirculated exhaust gas under the control of the engine control unit 170. The recirculation valve 70 opens and closes the first and second pathways 60a and 60b depending on driving conditions. For example, as shown in FIG. 3, if the vehicle drives under a high load condition, the recirculation valve 70 opens both pathways 60a and 60b. If the vehicle drives under a low load condition, the recirculation valve 70 opens only the second pathway 60b. Therefore, the supply of the recirculated exhaust gas is controlled according to the driving conditions. The recirculation valve 70 may be a solenoid valve, and the engine control unit 170 may control the current supplied to the valve in order to control the valve.

The amount of current supplied to the valve 70 under various driving conditions, as well as threshold values for the high and lower load conditions can be selected by a person of ordinary skill in the art based on the teachings herein.

The temperature detector 110 detects the temperature of the recirculated exhaust gas and transmits a signal corresponding thereto to the engine control unit 170. The temperature information of the recirculated exhaust gas is transmitted to an on board diagnostic (OBD) system, and is used for diagnosing the exhaust recirculation system.

Hereinafter, operation of an exhaust gas recirculation system according to an exemplary embodiment of the present invention will be described in detail.

The exhaust gas generated in the combustion process flows to the catalytic converter 40 via the exhaust pipe 100. The catalytic converter 40 removes noxious materials, such as carbon monoxide, nitrogen oxides, carbon, and hydrocarbons, from the exhaust gas, and exhausts the filtered exhaust gas to the exterior of the vehicle. Part of the filtered exhaust gas is supplied to the intake manifold runner 80 via the first and second recirculation gas pathways 50 and 60. The coolant flowing in the water jacket 150 cools the recirculated exhaust gas in the first pathway 50. Heat in the recirculated exhaust gas in the second pathway 60 radiates to the air.

The recirculation valve 70 control opening of the first and second pathways 60a and 60b. When the vehicle drives under high load conditions and needs a large amount of recirculated exhaust gas, the engine control unit 170 supplies a high current to the recirculation valve 70 and opens both pathways 60a and 60b. When the vehicle drives under low load conditions and needs only a little recirculated exhaust gas, the engine control unit 170 supplies a low current to the recirculation valve 70 and opens only the second pathway 60b. The recirculated exhaust gas is mixed with the air mixture and is supplied to the cylinder 140 via the intake hole 120.

According to exemplary embodiments of the present invention, since a recirculation gas pathway is provided in a cylinder block and recirculated exhaust gas is cooled by coolant in a water jacket, an additional cooling apparatus is not needed, lowering production cost. In addition, since supply of the recirculated exhaust gas is controlled based on driving conditions, fuel consumption is improved. Further, nitrogen oxides in the exhaust gas are reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An exhaust gas recirculation system of a vehicle, comprising:
   a cylinder block;
   a water jacket disposed in the cylinder block and configured for coolant to flow therein;
   a cylinder head attached to the cylinder block;
   a cylinder disposed in the cylinder block and the cylinder head, the cylinder comprising an intake hole and an exhaust hole;
   an intake manifold runner connected to the intake hole;
   an exhaust manifold runner connected to the exhaust hole;
   a first recirculation gas pathway disposed in the cylinder block, connected the exhaust manifold runner, and configured to receive recirculated exhaust gas from the exhaust manifold runner;
   a second recirculation gas pathway disposed in the cylinder head and comprising a first end in fluid communication with the first recirculation gas pathway and a second end in fluid communication with the intake manifold runner, wherein the second recirculation gas pathway comprises first and second pathway portions, fluidly isolated from one another;
   a recirculation valve mounted at the second recirculation gas pathway, for controlling supply of the recirculated exhaust gas to the intake manifold runner; and
   an engine control unit for controlling the recirculation valve.

2. The exhaust gas recirculation system of claim 1, wherein the first recirculation gas pathway is in thermal communication with the water jacket.

3. The exhaust gas recirculation system of claim 1, further comprising a catalytic converter disposed between the exhaust manifold runner and the first recirculation gas pathway.

4. The exhaust gas recirculation system of claim 1, further comprising a temperature sensor mounted on the second recirculation gas pathway for measuring a temperature of the recirculated exhaust gas.

5. The exhaust gas recirculation system of claim 1, wherein the first and second pathway portions of the second recirculation gas pathway are fluidly isolated from one another by a partition disposed along a longitudinal direction of the second recirculation gas pathway.

6. The exhaust gas recirculation system of claim 1, wherein the recirculation valve opens the first and/or second pathway portions depending on a driving condition of the vehicle.

7. The exhaust gas recirculation system of claim 6, wherein the recirculation valve opens the first and second pathway portions when the driving condition is a high load condition.

8. The exhaust gas recirculation system of claim 6, wherein the recirculation valve closes the first pathway portion and opens the second pathway portion when the driving condition is a low load condition.

9. The exhaust gas recirculation system of claim 1, wherein the recirculation valve comprises a solenoid valve.

* * * * *